(12) United States Patent
Swarnkar et al.

(10) Patent No.: US 8,503,275 B1
(45) Date of Patent: Aug. 6, 2013

(54) SEQUENTIAL-ACCESS OF STORAGE MEDIA

(75) Inventors: Jitendra Kumar Swarnkar, Fremont, CA (US); Vincent Wong, Fremont, CA (US)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 13/452,418

(22) Filed: Apr. 20, 2012

Related U.S. Application Data

(60) Provisional application No. 61/489,104, filed on May 23, 2011.

(51) Int. Cl.
*G11B 5/09* (2006.01)

(52) U.S. Cl.
USPC ............... 369/53.15; 369/53.17; 369/53.24; 369/47.14; 360/53

(58) Field of Classification Search
None
See application file for complete search history.

(56) References Cited

U.S. PATENT DOCUMENTS

| | | | |
|---|---|---|---|
| 5,844,920 A | 12/1998 | Zook et al. | |
| 7,203,015 B2 | 4/2007 | Sakai et al. | |
| 7,787,205 B2 | 8/2010 | Kuznetsov et al. | |
| 8,045,284 B2 | 10/2011 | Yang | |
| 8,045,285 B1 | 10/2011 | Yang et al. | |
| 2003/0072971 A1 | 4/2003 | Fukutani et al. | |
| 2003/0163759 A1* | 8/2003 | Arakawa | 714/8 |
| 2008/0080082 A1 | 4/2008 | Erden et al. | |
| 2008/0106816 A1 | 5/2008 | Silvus | |
| 2009/0003144 A1 | 1/2009 | Mallary et al. | |
| 2009/0091854 A1 | 4/2009 | Tang | |
| 2009/0122441 A1 | 5/2009 | Yang | |

FOREIGN PATENT DOCUMENTS

WO WO-2009064660 5/2009

OTHER PUBLICATIONS

"Advisory Action", U.S. Appl. No. 12/389,118, (Jun. 21, 2011), 3 pages.
"Final Office Action", U.S. Appl. No. 12/266,351, (Dec. 8, 2010), 9 pages.
"Final Office Action", U.S. Appl. No. 12/389,118, (Mar. 30, 2011), 9 pages.
"Non-Final Office Action", U.S. Appl. No. 12/266,351, (Feb. 24, 2011), 10 pages.
"Non-Final Office Action", U.S. Appl. No. 12/266,351, (Aug. 16, 2010), 9 pages.
"Non-Final Office Action", U.S. Appl. No. 12/389,118, (Nov. 5, 2010), 11 pages.
"Notice of Allowance", U.S. Appl. No. 12/266,351, (Jul. 21, 2011), 6 pages.
"Notice of Allowance", U.S. Appl. No. 12/389,118, (Jul. 21, 2011), 4 pages.
"PCT International Search Report", Application Serial No. PCT/US08/82686, (Feb. 17, 2009), 3 pages.
"Preliminary Report on Patentability and Written Opinion", Application No. PCT/US2008/082686, (May 27, 2010), 9 pages.
"Restriction Requirement", U.S. Appl. No. 12/266,351, (Jul. 19, 2010), 6 pages.
Terris, B D., et al., "Patterned Media for Future Magnetic Data Storage", *Microsystem Technologies*, vol. 13, No. 2, (Apr. 5, 2006), pp. 189-196.

* cited by examiner

*Primary Examiner* — Muhammad N Edun

(57) ABSTRACT

The present disclosure describes apparatuses and techniques of improved sequential-access of storage media. In some aspects an indication that a media disk interface failed to read a sector of a sequential-read during a revolution of the media disk is received and the media disk interface is caused to attempt to read a next sector of the sequential-read subsequent the sector failed to be read during a same revolution of the media disk.

20 Claims, 7 Drawing Sheets

SEQUENTIAL-ACCESS OF STORAGE MEDIA

RELATED APPLICATIONS

This present disclosure claims priority to U.S. Provisional Patent Application Ser. No. 61/489,104 filed May 23, 2011, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Computing devices often employ disk media for storing data of operating systems, databases, applications, and the like. Typically, data is stored to disks or platters of a media drive, such as a hard-disk drive or an array of hard-disk drives (e.g. data mirroring and/or striping). These disks or platters of the media drive are often configured to support concentric tracks of sectors in which the data of a computing device can be written to or read from. When data is read from sectors of a media disk during a read operation, the data is read from the sectors sequentially as a read/write head encounters each of the sectors while the media disk is rotated.

If the read/write head and its associated disk-read channel are unable to read a sector, however, the current read operation is typically halted and another attempt to read the unread sector is made during subsequent revolutions of the media disks rotation. Once data is read from the unread sector or the unread sector is classified as a failed sector during these subsequent revolutions, the read operation is restarted and the remaining sectors of the read operation are read. Halting and restarting disk read operations for each sector error, however, can degrade media drive performance as each additional revolution of the media disk may increase data seek-times, consume more power, and/or reduce operational lifetime of the media drive.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving, during a sequential-read of sectors of a media disk, an indication that a media disk interface failed to read one of the sectors during a revolution of the media disk, and causing, based on the indication, the media disk interface to attempt to read a next sector of the sequential-read subsequent the sector failed to be read during a same revolution of the media disk.

Another method is described for receiving, during a sequential-read of sectors of a media disk, an indication of failure to read one of the sectors during a revolution of the media disk, causing to be read based on the indication, a next sector of the sequential-read subsequent the sector failed to be read, the next sector being read during a same revolution of the media disk, and initiating after the revolution of the media disk, another read of the media disk by the media disk interface to attempt to read the sector failed to be read.

Still another method is described for receiving, during a sequential-write of sectors to a media disk, an indication that a media disk interface failed to write one of the sectors during a revolution of the media disk, and causing, based on the indication, the media disk interface to attempt to write a next sector of the sequential-write subsequent the sector failed to be written during a same revolution of the media disk.

A System-on-Chip (SoC) is described that is configured to receive, during a sequential-read of sectors of a media disk, an indication that a media disk interface failed to read one of the sectors during a revolution of the media disk, and cause, based on the indication, the media disk interface to attempt to read a next sector of the sequential-read subsequent the sector failed to be read during a same revolution of the media disk.

The details of one or more implementations are set forth in the accompanying drawings and the description below. Other features and advantages will be apparent from the description and drawings, and from the claims.

BRIEF DESCRIPTION OF THE DRAWINGS

In the figures, the left-most digit of a reference number identifies the figure in which the reference number first appears. The use of the same reference numbers throughout the description and the figures indicate like elements.

DETAILED DESCRIPTION

This disclosure describes apparatuses and techniques that enable subsequent sectors of a read operation to be read before an attempt is made to reread any sectors failed to be read. These apparatuses and techniques may also enable subsequent sectors of a write operation to be written before an attempt is made to rewrite any sectors failed to be written.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
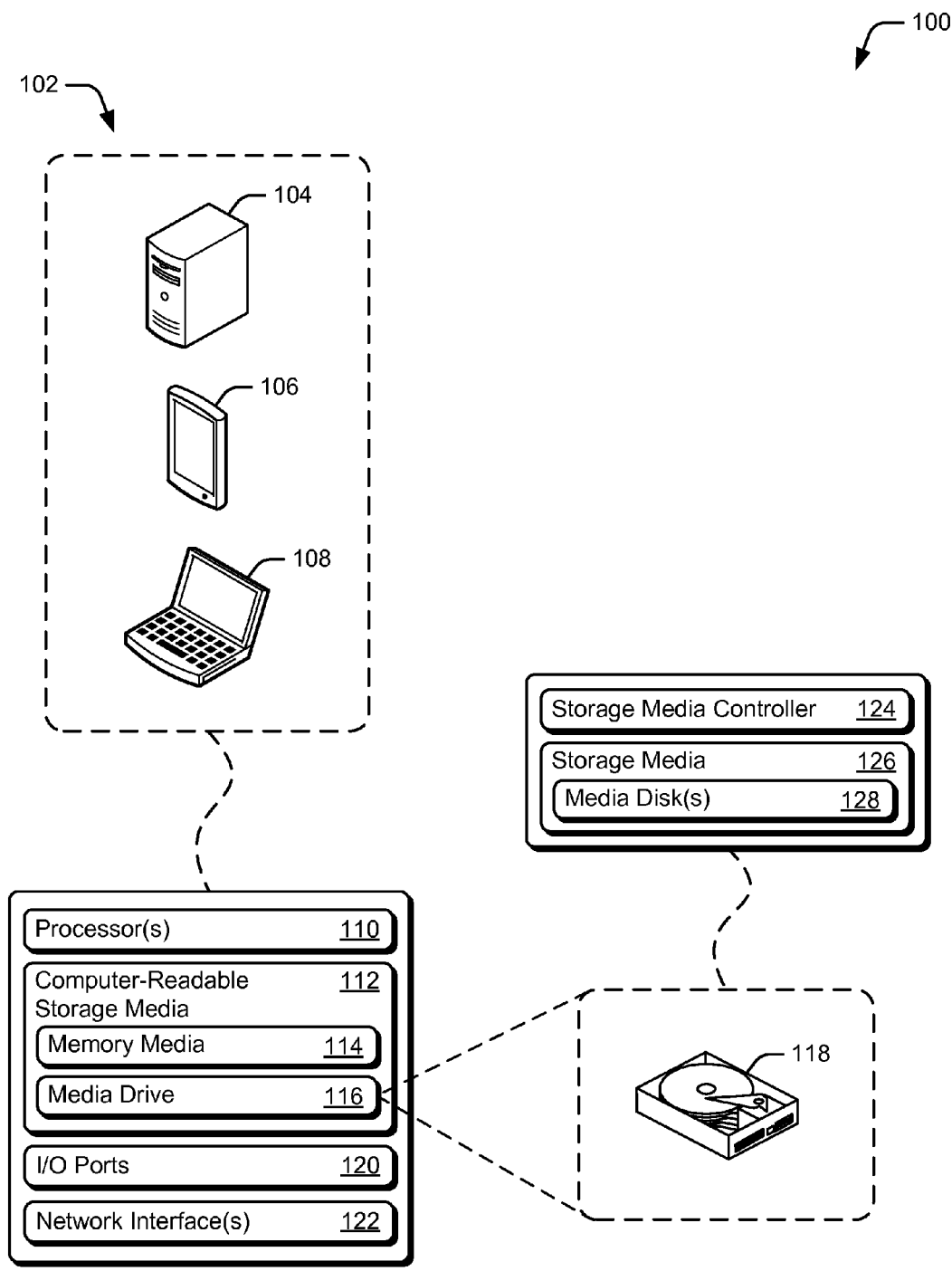
FIG. 1 illustrates an operating environment having computing devices in accordance with one or more aspects.

FIG. 1 illustrates an example operating environment 100 having a computing device 102, which is capable of communicating and/or storing data. Examples of a computing device 102 include a server 104, a tablet computer 106, or a laptop computer 108. Further examples of computing device 102 include a desktop computer, a smart phone, a set-top-box, an embedded communication device, a data storage appliance (e.g., network-attached storage), and so on. Computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

Computing device 102 includes processor(s) 110 and computer-readable storage media 112. Computer-readable storage media 112 may include any type and/or combination of suitable storage media, such as memory media 114 and media drive 116. Memory media 114 may include memory such as dynamic random-access memory (DRAM), read-only memory (ROM), or Flash memory (not shown) useful to store data of applications, databases, and/or an operating system of computing device 102. Media drive 116 may include hard-disk drive (HDD) 118 which is capable of storing data, which is described in more detail below. In some cases, this data is an operating system and/or applications of computing device 102 or data thereof. Processor(s) 110 can be any suitable type of processor, either single-core or multi-core, for executing instructions or commands of the operating system or applications of computing device 102.

Computing device 102 may also include I/O ports 120 and network interface(s) 122. I/O ports 120 allow computing device 102 to interact with other devices and/or users. I/O ports 120 may include any combination of internal or external ports, such as audio inputs and outputs, USB ports, Serial ATA (SATA) ports, PCI-express based ports or card-slots, and/or other legacy ports. Various peripherals may be operatively coupled with I/O ports 120, such as human-input devices (HIDs), external computer-readable storage media, or other peripherals.

Network interface(s) 122 provides connectivity to one or more networks and other devices connected therewith. Data communicated over network interfaces 122 may be encrypted or unencrypted depending on the environment in which computing device 102 is operating. Network interfaces 122 may include wired interfaces, such as Ethernet or fiber optic interfaces for communicating over a local network, intranet, or the Internet. Network interfaces 122 may also include wireless interfaces that facilitate communication over wireless networks, such as wireless LANs, cellular networks, and/or wireless personal-area-networks (WPANs).

Media drive 116, shown as hard-disk drive 118, here includes a storage media controller 124 and storage media 126. Although not shown, other configurations of media drive 116 are also contemplated such as a solid-state drive, a tape drive, and other storage devices that sequentially access storage media 126. Generally, storage media controller 124 enables computing device 102 to access contents of storage media 126, such as an operating system, applications, or data for applications or other services. Components of storage media controller 124 and how the components are implemented and used varies and are described below. Storage media 126 includes media disk(s) 128 for storing data of computing device 102. Alternately or additionally, storage media 126 may also include memory of a solid-state drive (e.g. Flash) or magnetic tape of a tape drive. Generally, storage media controller 124 writes data of computing device 102 to media disk 128 and reads data of computing device 102 from media disk 128. Configurations of media disk 128 and how media disk 128 is implemented and used varies and are described below.

Figure 2:
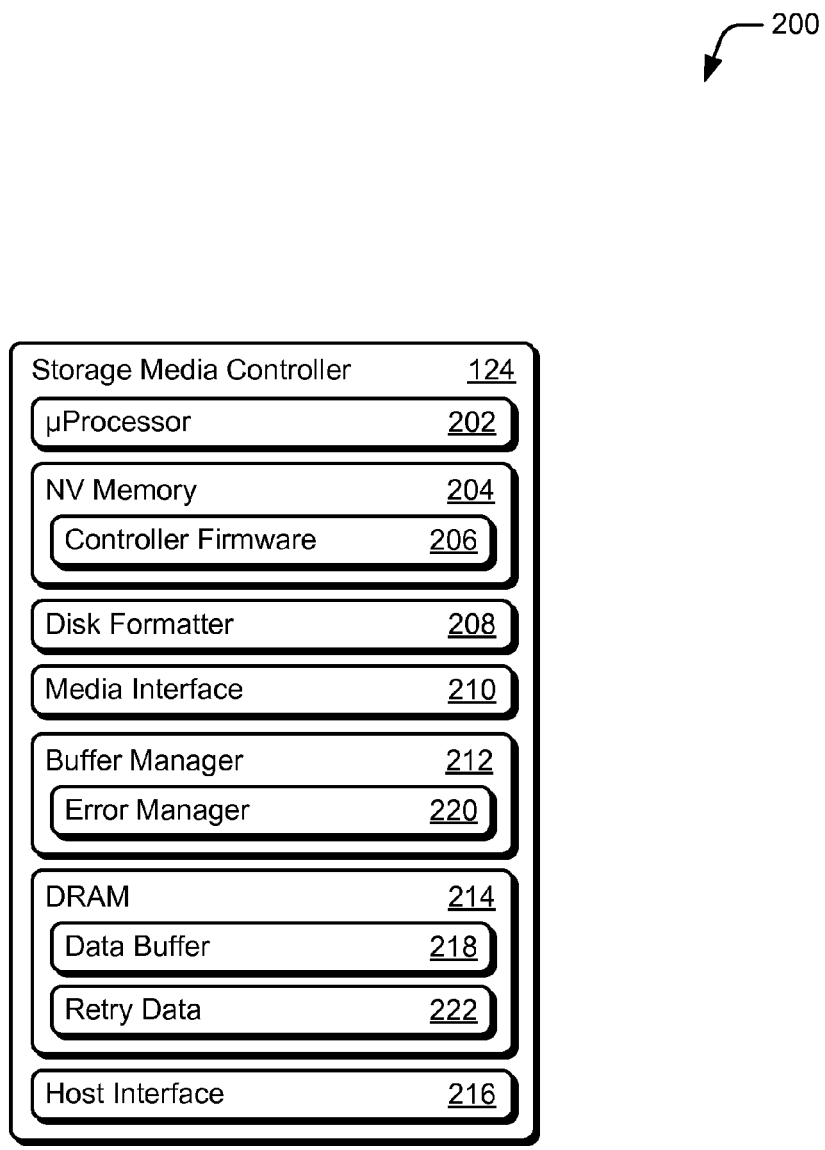
FIG. 2 illustrates a detailed aspect of an example storage media controller shown in FIG. 1.

FIG. 2 illustrates a detailed example of a storage media controller 124 capable of storing data of a computing device 102. Storage media controller 124 includes microprocessor 202 (µprocessor 202) and non-volatile memory 204 (NV memory 204), which stores controller firmware 206. NV memory 204 may include any suitable type of non-volatile memory such as Flash, static random-access memory (SRAM), non-volatile random-access memory (NVRAM), ROM, and so on. Generally, µprocessor 202 may execute code such as, controller firmware 206, to provide or coordinate various functions of storage media controller 124.

Storage media controller 124 also includes disk formatter 208 and media interface 210. Disk formatter 208 manages low-level aspects of writing data to and reading data from media disk 128 such as tracking and/or counting sectors of media disk 128. Media interface 210 may include a disk-read channel and a disk-write channel embodied as disparate or combined components. Media interface 210 may also be operably coupled to a disk read/write head (not shown) for writing data to and reading data from media disk 128.

By way of example, disk formatter 208 receives a command or instructions from controller firmware 206 to read data from a particular number of sectors from media disk 128. These instructions may include a read-count defining a number of sectors to read or a target sector address (e.g., logical sector number (LSN)) defining a sector of media disk 128 at which to start reading. Disk formatter 208 issues a read-gate command to media interface 210 when a current sector of media disk 128 matches the target sector address. Media interface 210 then reads data from the sector and passes this data to disk formatter 208. Disk formatter 208 issues another read-gate command once the data of the read sector is received and the process repeats until a number of sectors read matches the read-count. Alternately or additionally, data may be written to media disk 128 by media interface 210 in a similar fashion via a disk-write channel.

Storage media controller also includes buffer manager 212, DRAM 214, and host interface 216. Buffer manager 212 manages data buffer 218 of DRAM 214 including data read from, and data to be written to, media disk 128. In the example above, data received by disk formatter 208 from media interface 210 is passed to buffer manager 212 for storage in data buffer 218. Buffer manager also includes error manager 220. How error manager 220 is implemented and used varies and is described in more detail below. DRAM 214 also includes retry data 222 and may be implemented using any suitable type of memory, such as synchronous DRAM (SDRAM), double-data-rate (DDR) DRAM, and the like. Retry data 222 may be useful to attempt to reread or rewrite sectors of media disk 128 that media interface 210 previously fails to read or write. How retry data 222 is used varies and is described in more detail below. Host interface 216 communicates data with a host device, such as by transferring data from data buffer 218 to a computing device 102. Host interface 216 may include any suitable type of interface, such as advanced technology attachment (ATA), serial advanced technology attachment (SATA), external SATA (eSATA), peripheral component interconnect (PCI), PCI-Express, and Universal Serial Bus (USB).

Figure 3:
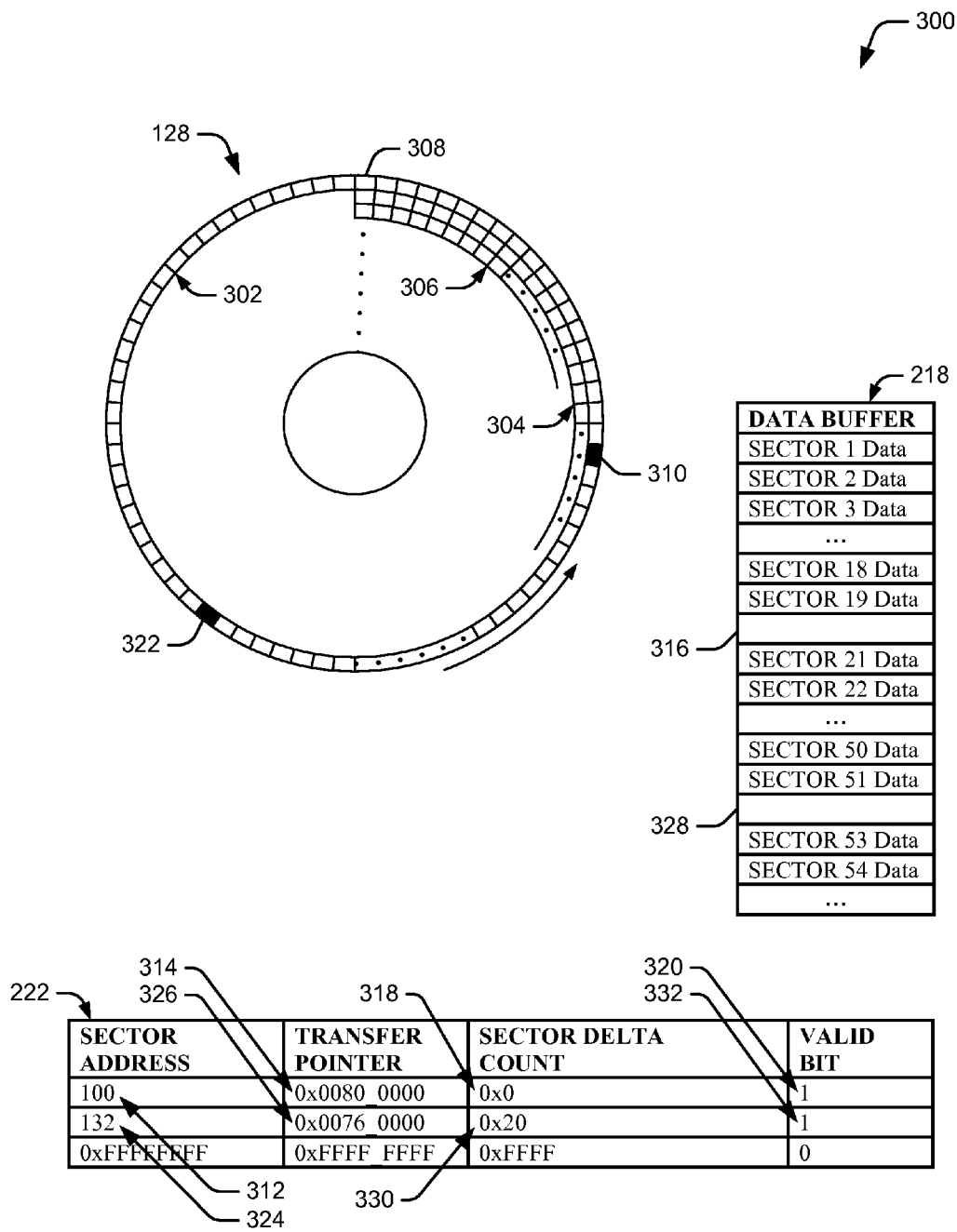
FIG. 3 illustrates a detailed aspect of an example media disk and other data in accordance with one or more aspects.

FIG. 3 illustrates detailed examples of media disk 128, data buffer 218, and retry data 222. Media disk 128 includes tracks 302, 304, 306 (tracks 304 and 306 shown partially for clarity), which are concentric tracks of sectors (e.g., sector 308) in which data is stored. Media disk 128 may include any suitable number and/or configuration of tracks or sectors to support data storage. Generally, as media disk 128 rotates, a read/write head (not shown) writes data to, or reads data from, sectors sequentially as each sector is encountered due to the rotation.

Data buffer 218 stores data to be written to or read from media disk 128 in sequential order. Retry data 222, shown here configured as a table, includes information associated with sectors of media disk 128 that media interface 210 fails to read or write during a media access operation. This information may include a sector address of a sector failed to be read, a transfer pointer to an entry in data buffer 218 at which data of the sector failed to be read can be stored, a sector delta count indicating a number of read sectors following the sector failed to be read, and/or a valid bit indicating that the data up to the sector failed to be read is valid or that an end of the table has been reached.

Alternately or additionally, this information may include a sector address of a sector failed to be written, a transfer pointer to an entry in data buffer 218 at which data of the sector failed to be written can be stored, a sector delta count indicating a number of written sectors preceding the sector failed to be written, and/or a valid bit indicating that the data up to the sector failed to be written is valid or that an end of the table has been reached. How data buffer 218 and retry data 222 are implemented and used varies and is described below.

Techniques of Improved Sequential-Access

The following discussion describes techniques of improved sequential-access of storage media. These techniques can be implemented using the previously described environment, such as error manager 220 of FIG. 2 embodied on a computing device 102 or media drive 116. These techniques include methods illustrated in FIGS. 4, 5 and 6, each of which is shown as a set of operations performed by one or more entities. These methods are not necessarily limited to the orders shown for performing the operations. Further, these methods may be used in conjunction with one another, whether performed by the same entity, separate entities, or any combination thereof. In portions of the following discussion, reference will be made to operating environment 100 of FIG. 1 and entities of FIGS. 2 and 3 by way of example. Such reference is not to be taken as limited to operating environment 100 but rather as illustrative of one of a variety of examples.

Figure 4:
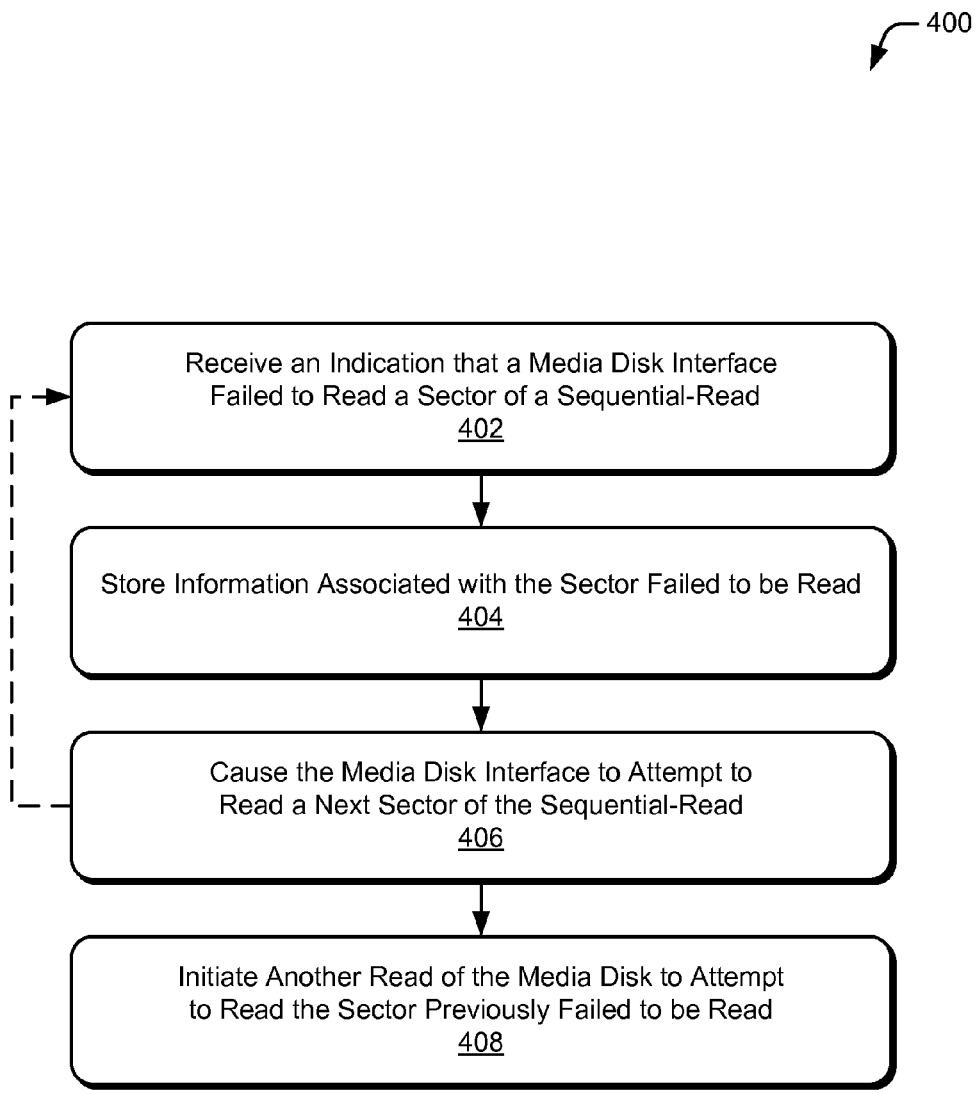
FIG. 4 illustrates a method of causing a media disk interface to attempt to read a next sector of a sequential-read subsequent a sector failed to be read.

FIG. 4 depicts a method 400 for causing a media disk interface to read a next sector subsequent a sector failed to be read, including operations performed by error manager 220 of FIG. 2. Generally, method 400 defers an attempt to read a sector previously failed to be read until after an attempt has been made to read subsequent sectors of a sequential-read.

At 402, an indication that a media disk interface failed to read a sector of a sequential-read is received. This indication may be received during a sequential-read of a media disk. The media disk interface may have failed to read the sector during a particular revolution of a media disk, such as a first revolution of a media disk associated with a sequential-read.

In some cases, the indication may include information associated with the sector failed to be read (e.g., retry information), such as an address of the sector failed to be read on the media disk, an address of a location within a data buffer configured to receive data of the sector failed to be read, or a number of read sectors preceding or following the sector failed to be read in the sequential-read that were read by the media disk interface. The number of sectors may indicate a number of sectors sequentially read between the sector failed to be read and a preceding sector failed to be read of the sequential-read.

As an example, consider server 104 having HDD 118 in the context of FIGS. 1 and 2, which show components of HDD 118 and storage media controller 124. Assume here that server 104 is fetching user data, which in turn initiates a sequential-read of sectors of media disk 128 to retrieve the user data. Media interface 210, while performing the sequential-read of media disk 128, fails to read (e.g. is unable to successfully decode) a sector of media disk 128. Here error manager 220 receives an indication, from media interface 210, that a sector of media disk 128 was not successfully read.

At 404, information associated with the sector failed to be read is stored. This information may be received with the indication that the sector was not successfully read or from another entity of a storage media controller such as a disk formatter or buffer manager. In some cases this information is stored in a buffer or other data structure in a memory of a storage media controller. In such cases, the buffer or other data structure may be configured to store data read from other sectors of the sequential-read. For example, a memory buffer may be partitioned into a data buffer to store data read from sectors of a sequential-read and a retry data buffer to store data associated with sectors failed to be read of the sequential-read.

In the context of the present example, error manager 220 stores information associated the sector media interface 210 failed to read as retry data 222. Assume here that the information stored as retry data 222 includes a logical sector number of the sector failed to be read and a pointer to a location in data buffer 218 configured to receive data from the sector failed to be read.

At 406, the media disk interface is caused to attempt to read a next sector of the sequential-read subsequent the sector failed to be read. This next sector of the sequential-read may be immediately subsequent the sector failed to be read. In some cases, the media disk interface is caused to attempt to read some or all of the sectors of the sequential-read subsequent the sector failed to be read.

The attempt to read the next sector of the sequential-read may occur during a same revolution of the media disk in which the media disk interface failed to read the sector of the sequential-read. Causing the media disk interface to attempt to read a next sector of the sequential-read may be effective to defer an attempt to read the sector failed to be read until after an attempt has been made to read some or all of the sectors of the sequential-read.

From operation 406, method 400 may return to operation 402 or proceed to operation 408. Method 400 may return to 402 when another indication that the media disk interface failed to read another sector of the sequential-read is received and operations 402, 404, and 406 may be repeated as necessary until an attempt is made to read some or all of the sectors the sequential-read.

Continuing the ongoing example, error manager 220 causes media interface 210 to read another sector of the sequential-read that is immediately subsequent the sector failed to be read. Assume here that media interface 210 is then able to read the sector immediately subsequent the sector failed to be read, as well as the rest of the sectors of the sequential-read subsequent the sector failed to be read.

At 408, another read of the media disk is initiated to attempt to read the sector previously failed to be read. This other read of the media disk may be based on the indication that the media disk interface failed to read the sector or information associated with the sector failed to be read. In some cases, the other read of the disk is initiated after an attempt is made to read some or all of the sectors of a sequential-read. In such cases, the other read of the media disk may occur during a revolution subsequent a revolution associated with the sequential-read.

Concluding the present example, error manager 220 initiates another read of media disk 128 based on retry data 222 that includes the logical sector number of the sector failed to be read and the pointer to the location in data buffer 218. Assume here that media interface 210 is able to read data from the sector previously failed to be read during a subsequent revolution of media disk 128. Buffer manager 212 can then store the data of the sector previously failed to be read in data buffer 218, which permits the sequential-read to complete as data is transferred to server 104.

Figure 5:
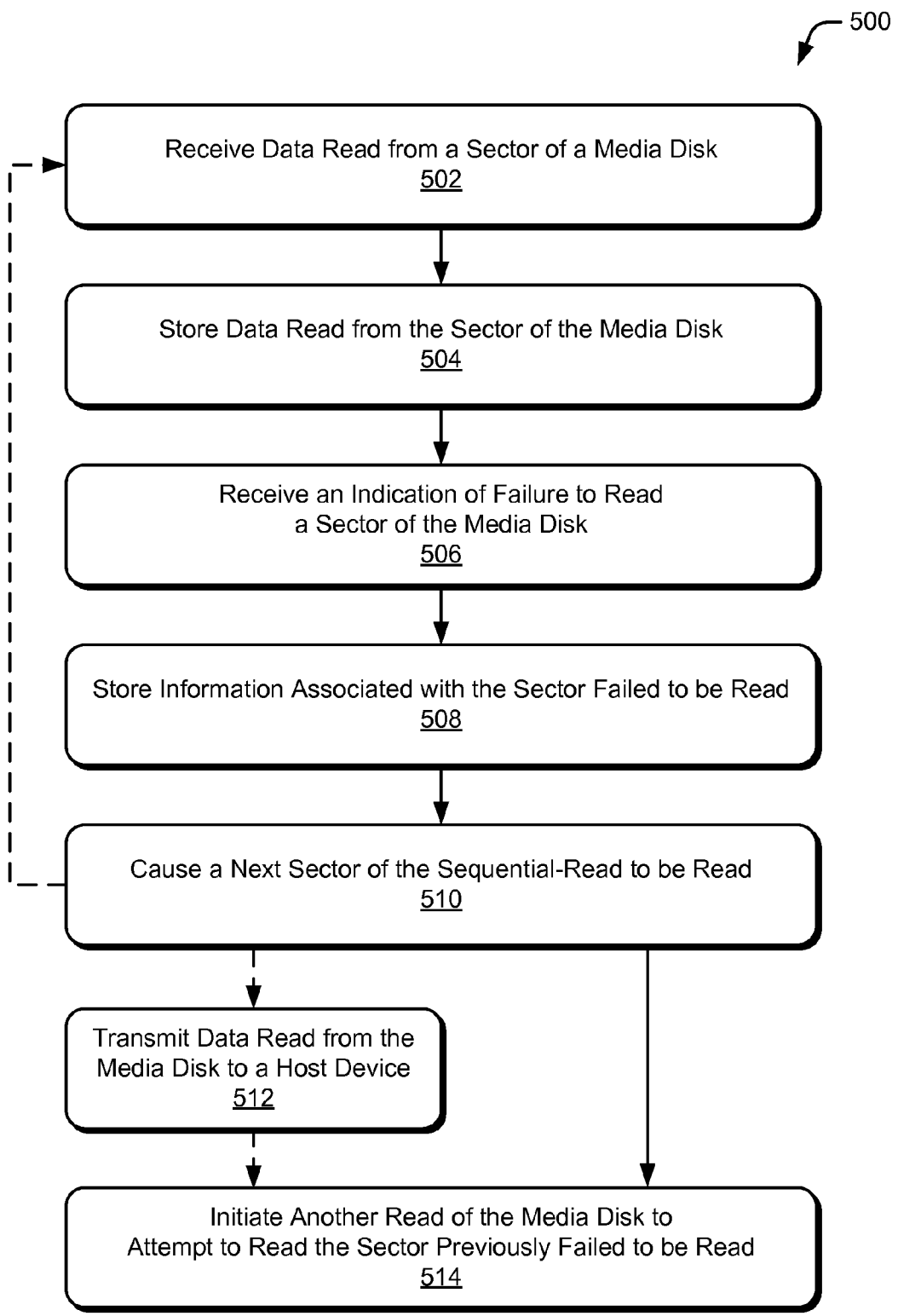
FIG. 5 illustrates a method of causing a next sector of a sequential-read to be read.

FIG. 5 depicts a method 500 for causing a next sector of a sequential-read to be read, including operations performed by error manager 220 of FIG. 2. Generally, method 500 defers an attempt to read a sector failed to be read during a sequential read until an attempt has been made to read each sector of the sequential-read.

At 502, data read from a sector of a media disk is received. The data may be read by or received from a media disk interface such as a media disk-read channel. This data may be part of a sequential-read of the media disk in which data is read sequentially from sectors of a track of the media drive. In such a case, data read from multiple sectors of the media drive may be received as part of the sequential-read. A sequential-read of the media drive may be initiated by firmware of a storage media controller or managed by a disk formatter of a storage media controller.

As an example, consider laptop computer 108 having HDD 118 in the context of FIGS. 2 and 3, which show components of HDD 118 and storage media controller 124. Assume here that a user selects a multimedia file to view, which in turn initiates a sequential-read of sectors of media disk 128 to retrieve data of the multimedia file. Controller firmware 206 issues a read command to disk formatter 208, which initiates a sequential-read of sectors 1 through 54 of media disk 128. Here disk formatter 208 in turn issues read commands, as part of the sequential-read, to media interface 210. Buffer manager 212 then receives, from media interface 210, data read from the sectors of media disk 128 (e.g., sector 308 or sectors 1-19).

At 504, data read from the sector of a media disk is stored. The data read from the sector (i.e., a read sector) may be stored in any suitable data structure, such as a buffer or table maintained within a memory of a storage media controller. In some cases, the data is stored sequentially in a buffer or table to maintain an order of the data. The data may be stored in any suitable fashion, such as on a sector-by-sector basis or as a multi-sector block.

In the context of the present example, buffer manager 212 stores data received from media interface 210 in data buffer 218. Here buffer manager 212 stores data from sectors 1 through 19 sequentially as shown in data buffer 218. By so doing, an order of the data is maintained as the data is read from the sectors of media disk 128 during the sequential-read.

At 506, an indication of failure to read a sector of a media disk is received. The sector that was not read (i.e., an unread sector or sector failed to be read) may be part of a sequential-read of the media disk. This indication may be received during a sequential-read of the media disk. In some cases, the indication may include information associated with the sector failed to be read (e.g., retry information), such as an address of the sector failed to be read on the media disk, an address of a location within a data buffer configured to receive data of the sector failed to be read, or a number of read sectors preceding or following the sector failed to be read in the sequential-read that were read. In some cases, the number of read sectors is a number of sectors sequentially read between the sector failed to be read and a preceding sector failed to be read of the sequential-read.

Continuing the ongoing example, when media interface 210 fails to read sector 310 (e.g., sector 20 of media disk 128), error manager 220 receives an indication from disk formatter 208 that sector 310 was not read. This indication includes information associated with sector 310 that error manager 220 stores in retry data 222. This information includes sector address 312 for sector 310, transfer pointer 314 for data buffer location 316 in data buffer 218 at which data read from sector 310 is to be stored. Additionally, this information may include sector delta count 318 which indicates here, as sector 310, is the first sector failed to be read of the sequential-read, that zero of the preceding read sectors follow another sector failed to be read of the sequential-read. Error manager 220 also sets valid bit 320 for sector 310 which indicates that data read from sectors preceding sector 310 in the sequential-read is valid.

At 508, information associated with the sector failed to be read is stored. This information may be received with the indication that the sector was not read or from another entity of a storage media controller such as a disk formatter or buffer manager. In some cases this information is stored in a buffer or other data structure in a memory of a storage media controller. In such cases, the buffer or other data structure may be configured to store data read from other sectors of the sequential-read. For example, a memory buffer may be partitioned into a data buffer to store data read from sectors of a sequential-read and a retry data buffer to store data associated with sectors failed to be read of the sequential-read.

In the context of the present example and as shown in FIG. 3, error manager 220 stores the information associated with sector failed to be read 310 in retry data 222, which in this particular example, is configured as a table. Also note that, although shown here implemented as disparate entities, data buffer 218 and retry data 222 may be implemented in combination, residing in a single memory buffer (e.g. DRAM 214) or partitioned data structure.

At 510, a next sector of the sequential-read is caused to be read. This next sector of the sequential-read may be immediately subsequent the sector failed to be read. In some cases, a media disk interface is caused to attempt to read some or all of the sectors of the sequential-read subsequent the sector failed to be read.

The attempt to read the next sector of the sequential-read may occur during a same revolution of the media disk in which the failure to read the sector of the sequential-read occurred. Causing a next sector of the sequential-read to be read may be effective to defer an attempt to read the sector failed to be read until after an attempt has been made to read some or all of the sectors of the sequential-read.

From operation 510, method 500 may return to operation 502 or proceed to operation 512 or operation 514. Returning to 502, data read from remaining sectors of the sequential-read may be received and operations 502, 504, 506, 508, and/or 510 may be repeated as necessary until the sequential-read of the media disk is completed. For instance, operations 506, 508, 510 may be repeated when a media read-channel is unable to read a subsequent sector as part of an ongoing sequential-read of a media disk.

Continuing the ongoing example, media interface 210 continues to read data from sectors 21 through 51 of media disk 128 until encountering sector 322 (e.g., sector 52 of media disk 128), which media interface 210 fails to read. Here, similarly to as described above, error manager 220 stores information associated with sector 322 in retry data 222. The information stored by error manager 220 includes sector address 324 for sector 322, transfer pointer 326 for data buffer location 328 in data buffer 218 at which data read from sector 322 is to be stored, and sector delta count 330, which indicates here that 32 of the preceding read sectors following another sector failed to be read (e.g., sector 310) of the sequential-read. Error manager 220 also sets valid bit 332 for sector 322, which indicates that data read from sectors preceding sector 322 in the sequential-read is valid. Alternately or additionally, an additional status bit may be used to indicate an end of retry data 222 or an end of a data structure containing retry data 222. Media interface 210 then continues to read data from the remaining sectors of the sequential-read, here sectors 53 and 54 of media disk 128.

Optionally at 512, data read from the media disk is transmitted to a host device. This data may be transmitted by a host interface operably coupled with a system bus of the host device. In some cases, data read from multiple sectors of the media disk is transmitted to a host device. Alternately or additionally, the data may be transferred sequentially to the host device from a buffer or data structure configured to store the data as it is read from a media disk. In such a case, data may be transferred to the host device until an empty location in the buffer or data structure (e.g., a location reserved for data of a sector failed to be read) is encountered. In the context of the present example, controller firmware 206 transmits data of sectors 1 through 19 to laptop computer 108 via host interface 216.

At 514 another read of the media disk is initiated to attempt to read the sector previously failed to be read of the sequential-read. This other read of the media disk can be enabled by storing or exposing information associated with the sector failed to be read. Alternately or additionally, the other read can be responsive to an indication of failure to read the sector during a previous sequential-read of the media disk. In some cases, the other read of the disk is initiated after an attempt is made to read some or all of the sectors of a sequential-read. In such cases, the other read of the media disk may occur during a revolution subsequent a revolution associated with the sequential-read.

The other read of the media disk may be a read of a single sector failed to be read, another sequential-read of multiple sectors failed to be read, or a set of reads targeting multiple sectors failed to be read. Alternately or additionally, multiple attempts may be made to read the sector failed to be read. A number of multiple attempts may be limited based on a success rate of the multiple attempts or based on an impact the multiple attempts have on media drive performance. For example, a limit for multiple read attempts of a sector failed to be read may be set during manufacturing based on a media drive characterization algorithm.

In the context of the present example, controller firmware 206 initiates another read of media disk 128 to attempt to read sector failed to be read 310. Here, as described above, controller firmware 206 issues a read command disk formatter 208, which in turn issues a read-gate command to media interface 210. Media interface 210 then attempts to read sector 310 during a subsequent revolution of media disk 128.

Concluding the present example, assume that media interface 210 is able to read data from sector failed to be read 310 during a subsequent revolution of media disk 128. Here, buffer manager 212 receives data of sector failed to be read 310 from media interface 210 and stores this data in buffer location 316 of data buffer 218. Controller firmware 206 then transmits data of sector 20 (previously failed to be read) through sector 51 to laptop computer 108 via host interface 216.

Having transmitted data of sectors 1 through 51 to laptop computer 108, controller firmware initiates another read command to attempt to read sector 322. Assume here that media interface 210 is able to read the data from sector failed to be read 322 during another subsequent revolution of media disk 128. Buffer manager 212 receives data of sector 322 from media interface 210 and stores this data in buffer location 328 of data buffer 218. Controller firmware 206 then transmits data of sector 52 (previously failed to be read) through sector 54 to laptop computer 108 via host interface 216 to complete the sequential-read of sectors 1-54 of media disk 128. By way of the above example, the techniques described herein permit data to be transmitted to a host device prior to attempting to read all sectors failed to be read thereby improving media drive performance.

Figure 6:
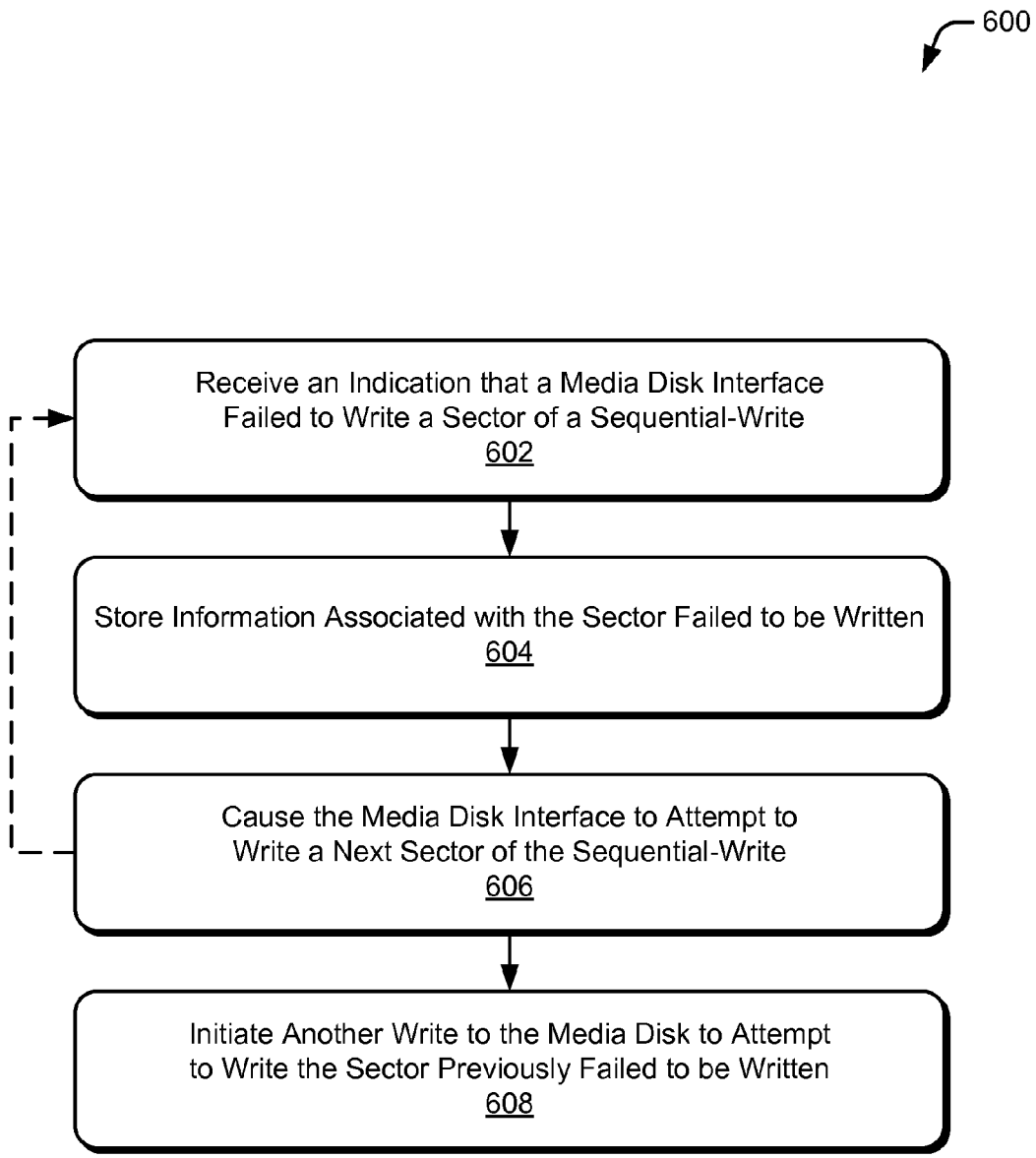
FIG. 6 illustrates a method of causing a media disk interface to attempt to write a next sector of a sequential-write subsequent a sector failed to be written.

FIG. 6 depicts a method 600 for causing a media disk interface to write a next sector subsequent a sector failed to be written, including operations performed by error manager 220 of FIG. 2. Generally, method 600 defers an attempt to write a sector previously failed to be written until after an attempt has been made to write subsequent sectors of a sequential-write.

At 602, an indication that a media disk interface failed to write a sector of a sequential-write is received. This indication may be received during a sequential-write to a media disk. The media disk interface may have failed to write the sector during a particular revolution of a media disk, such as a first revolution of a media disk associated with a sequential-write.

In some cases, the indication may include information associated with the sector failed to be written (e.g., retry information), such as an address of the sector failed to be written on the media disk, an address of a location within a data buffer configured to store data of the sector failed to be written, or a number of written sectors preceding or following the sector failed to be written in the sequential-write that were written by the media disk interface. The number of sectors may indicate a number of sectors sequentially written between the sector failed to be written and a preceding sector failed to be written of the sequential-write.

At 604, information associated with the sector failed to be written is stored. This information may be received with the indication that the sector was not successfully written or from another entity of a storage media controller such as a disk formatter or buffer manager. In some cases this information is stored in a buffer or other data structure in a memory of a storage media controller. In such cases, the buffer or other data structure may be configured to store data written from other sectors of the sequential-write. For example, a memory buffer may be partitioned into a data buffer to store data to be written to sectors of a sequential-write and a retry data buffer to store data associated with sectors failed to be written during the sequential-write.

At 606, the media disk interface is caused to attempt to write a next sector of the sequential-write subsequent the sector failed to be written. This next sector of the sequential-write may be immediately subsequent the sector failed to be written. In some cases, the media disk interface is caused to attempt to write some or all of the sectors of the sequential-write subsequent the sector failed to be written.

From operation 606, method 600 may return to operation 602 or proceed to operation 608. Method 600 may return to 602 when another indication that the media disk interface failed to write another sector of the sequential-write is received and operations 602, 604, and 606 may be repeated as necessary until an attempt is made to write some or all of the sectors the sequential-write.

At 608, another write of the media disk is initiated to attempt to write the sector previously failed to be written. This other write of the media disk may be based on the indication that the media disk interface failed to write the sector or information associated with the sector failed to be written. In some cases, the other write of the disk is initiated after an attempt is made to write some or all of the sectors of a sequential-write. In such cases, the other write of the media disk may occur during a revolution subsequent a revolution associated with the sequential-write.

System-on-Chip

Figure 7:
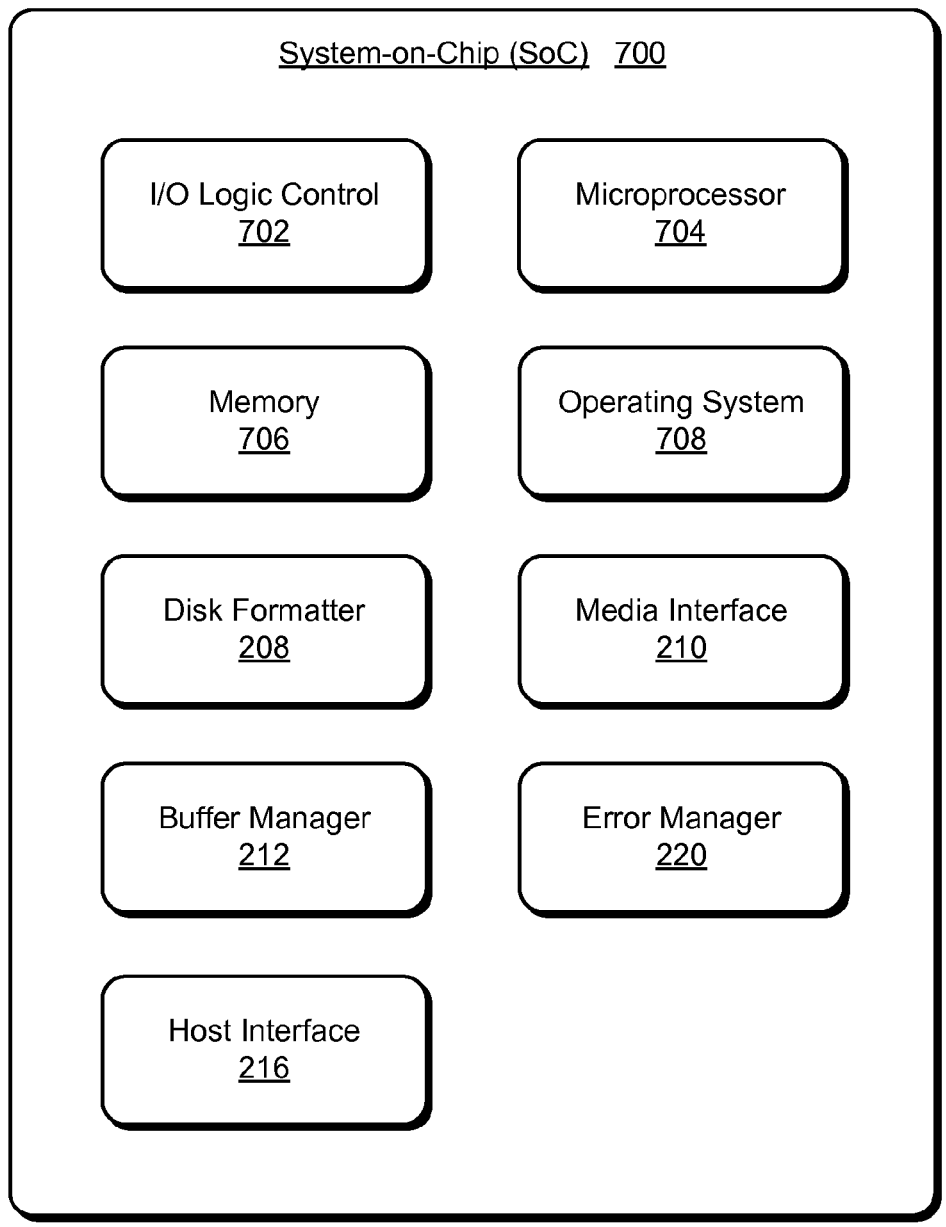
FIG. 7 illustrates a System-on-Chip (SoC) environment for implementing aspects of the techniques described herein.

FIG. 7 illustrates a System-on-Chip (SoC) 700, which can implement various embodiments described above. A SoC can be implemented in any suitable computing device, such as a video game console, IP enabled television, desktop computer, laptop computer, tablet computer, server, network-enabled printer, set-top box, and/or any other type of device that may employ media drives for data storage.

SoC 700 can be integrated with electronic circuitry, a microprocessor, memory, input-output (I/O) logic control, communication interfaces and components, other hardware, firmware, and/or software needed to provide communicate coupling for a device, such as any of the above-listed devices. SoC 700 can also include an integrated data bus (not shown) that couples the various components of the SoC for data communication between the components. A wireless communication device that includes SoC 700 can also be implemented with many combinations of differing components. In some cases, these differing components may be configured to implement concepts described herein over a wireless connection or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., flash memory, DRAM 214), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes disk formatter 208, media interface 210, buffer manager 212, error manager 220, and host interface 216 (embodied as disparate or combined components as noted above). Examples of these various components, functions, and/or entities, and their corresponding functionality, are described with reference to the respective components of the environment 100 shown in FIG. 1 and FIG. 2.

Error manager 220 in SoC 700, either independently or in combination with other entities, can be implemented as computer-executable instructions maintained by memory 706 and executed by microprocessor 704 to implement various embodiments and/or features described herein. Error manager 220 may also be provided integral with other entities of the SoC, such as integrated with one or both of I/O logic controller 702 or any packet-based interface within SoC 700. Alternatively or additionally, error manager 220 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving, during a sequential-read of sectors of a media disk, an indication that a media disk interface failed to read one of the sectors during a revolution of the media disk; and
responsive to the indication, causing the media disk interface to read, during the same revolution of the media disk, a next sector of the sequential-read subsequent to the sector that the media disk interface failed to read, the causing effective to defer an attempt to read the sector that the media disk interface failed to read until after an attempt has been made to read each other sector of the sequential-read.

2. The method of claim 1, wherein the indication that the media disk interface failed to read the sector includes information associated with the sector that the media disk interface failed to read.

3. The method of claim 2, wherein the information associated with the sector that the media disk interface failed to read includes a media disk address of the sector that the media disk interface failed to read, an address of a location within a data buffer configured to receive data of the sector that the media disk interface failed to read, or a number of read sectors of the sequential-read that precede or follow the sector that the media disk interface failed to read.

4. The method of claim 2, further comprising storing, in a buffer, the information associated with the sector that the media disk interface failed to read.

5. The method of claim 1, further comprising, based on the indication that the media disk interface failed to read the sector, initiating another read of the media disk to attempt the read the sector that the media disk interface failed to read.

6. The method of claim 1, wherein the next sector of the sequential-read is immediately subsequent the sector that the media disk interface failed to read.

7. The method of claim 1, wherein an order of the sequential-read is defined by an order in which the sectors of the sequential-read are encountered by the media disk interface based on rotation of the media disk.

8. A media drive comprising:
one or more media disks each having concentric tracks of sectors;
a storage media controller configured to access the one or more media disks, the storage media controller comprising:
a host interface configured to transmit data to, or receive data from, a host device;
a media disk interface configured to write data to, or read data from, the one or more media disks;
a buffer configured to store data associated with the storage media controller; and
an error manager configured to:
receive, during a sequential-read of sectors of one of the media disks and from the media disk interface, an indication that the media disk interface failed to read one of the sectors during a revolution of the media disk;
responsive to the indication, cause the media disk interface to read, during the same revolution of the media disk, a next sector of the sequential-read subsequent to the sector that the media disk interface failed to read, the causing effective to defer an attempt to read the sector that the media interface failed to read until after an attempt has been made to read each other sector of the sequential-read; and
initiate, after the revolution of the media disk, another read of the media disk by the media disk interface to attempt to read the sector that the media disk interface failed to read.

9. The media drive of claim 8, further comprising storing, in the buffer, information associated with the sector that the media disk interface failed to read.

10. The media drive of claim 9, wherein the information associated with the sector that the media disk interface failed to read includes a media disk address of the sector that the media disk interface failed to read, an address of a location within the buffer configured to receive data of the sector that the media disk interface failed to read, or a number of read sectors of the sequential-read that precede or follow the sector that the media disk interface failed to read.

11. The media drive of claim 9, wherein to initiate the other read of the media disk is initiated based on the information associated with the sector that the media disk interface failed to read that is stored in the buffer.

12. The media drive of claim 9, wherein a first partition of the buffer is configured to store data read from sectors of the media disk and a second partition of the buffer is configured to store information associated with one or more sectors that the media disk interface failed to read.

13. A system-on-chip (SoC) comprising:
a host interface configured to transmit data to a host device;
a media disk interface configured to read data from a media disk;
a buffer configured to store data read from the media disk prior to transmission to the host device; and
an error manager configured to:
receive, during a sequential-read of sectors of the media disk, an indication that the media disk interface failed to read one of the sectors during a revolution of the media disk; and
responsive to the indication, cause the media disk interface to attempt to read, during the same revolution of the media disk, a next sector of the sequential-read subsequent to the sector that the media disk interface failed to read, the causing effective to defer an attempt to read the sector that the media disk interface failed to read until after an attempt has been made to read each other sector of the sequential-read.

14. The SoC of claim 13, wherein the error manager is further configured to store, in the buffer, information associated with the sector that the media disk interface failed to read.

15. The SoC of claim 14, wherein the information associated with the sector that the media disk interface failed to read includes a media disk address of the sector that the media disk interface failed to read, an indication of a location within the buffer configured to receive data of the sector that the media disk interface failed to read, or a number of read sectors of the sequential-read that precede or follow the sector that the media disk interface failed to read.

16. The SoC of claim 15, wherein the address of the sector that the media disk interface failed to read includes a logical sector number of the sector that the media disk interface failed to read and the indication of the location within the buffer includes a pointer to the location within the buffer configured to receive the data of the sector that the media disk interface failed to read.

17. The SoC of claim 13, wherein the error manager is further configured to, prior to initiating the other read of the media disk, cause at least some data read from other sectors of the sequential-read to be transferred to the host device via the host device interface.

18. The SoC of claim 17, wherein to cause at least some of the data read from the other sectors of the sequential-read to be transferred includes transferring data from the other sectors that precede, in the sequential-read of the media disk, the sector that the media disk interface failed to read.

19. The SoC of claim 13, wherein the SoC is embodied as a storage media controller.

20. The SoC of claim 13, wherein the next sector of the sequential-read is immediately subsequent the sector failed to be read.

* * * * *